United States Patent
Namkung

(10) Patent No.: US 8,963,870 B2
(45) Date of Patent: Feb. 24, 2015

(54) MOBILE TERMINAL

(71) Applicant: LG Electronics Inc., Seoul (KR)

(72) Inventor: Eun Namkung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/895,641

(22) Filed: May 16, 2013

(65) Prior Publication Data

US 2014/0125606 A1 May 8, 2014

(30) Foreign Application Priority Data

Nov. 2, 2012 (KR) ........................ 10-2012-0123475

(51) Int. Cl.
G06F 3/041 (2006.01)
G06F 3/0354 (2013.01)
G06F 1/16 (2006.01)
G06F 3/038 (2013.01)
G06F 3/0488 (2013.01)

(52) U.S. Cl.
CPC .......... *G06F 3/03545* (2013.01); *G06F 1/1656* (2013.01); *G06F 1/169* (2013.01); *G06F 3/038* (2013.01); *G06F 3/0416* (2013.01); *G06F 3/04883* (2013.01); *G06F 2203/0384* (2013.01)

USPC ........................................... 345/173; 345/179

(58) Field of Classification Search
None
See application file for complete search history.

(56) References Cited

U.S. PATENT DOCUMENTS

| 2008/0131189 A1* | 6/2008 | Yoon .............................. 401/116 |
| 2012/0262407 A1* | 10/2012 | Hinckley et al. ............... 345/173 |
| 2013/0207937 A1* | 8/2013 | Lutian et al. .................. 345/175 |
| 2014/0043245 A1* | 2/2014 | Dowd et al. .................... 345/173 |
| 2014/0043279 A1* | 2/2014 | Pedersen et al. ............... 345/174 |

* cited by examiner

*Primary Examiner* — Adam R Giesy
*Assistant Examiner* — Henok Heyi
(74) *Attorney, Agent, or Firm* — KED & Associates LLP

(57) ABSTRACT

There is disclosed a mobile terminal including a touchscreen configured to generate a touch signal by sensing touch input, a stylus pen having a variable length, and comprising a first pen tip provided in an end to touch the surface of the touchscreen to create a first touch signal, a sensing part configured to sense state variation of the stylus pen including length variation of the stylus pen, and a controller configured to switch an input mode of the touchscreen according to the state variation of the stylus pen, wherein the input mode selects one of a mouse input mode, a gesture input mode; and a quick-memo input mode.

20 Claims, 16 Drawing Sheets

MOBILE TERMINAL

CROSS-REFERENCE TO RELATED APPLICATION(S)

Pursuant to 35 U.S.C. §119(a), this application claims the benefit of earlier filing date and right of priority to Korean Application No. 10-2012-0123475, filed on Nov. 2, 2012, the contents of which are hereby incorporated by reference herein in their entirety.

BACKGROUND

1. Field

The present invention relates to a mobile terminal including a stylus pen that is able to enhance convenience of input to a touchscreen.

2. Background

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

SUMMARY OF THE DISCLOSURE

Accordingly, the present invention is directed to a mobile terminal that substantially obviates one or more problems due to limitations and disadvantages of the related art. An object of the present invention is to provide a mobile terminal including a stylus pen that is able to enhance convenience of input thereto by operating the stylus pen to switch an input mode.

To achieve these objects and other advantages and in accordance with the purpose of the invention, as embodied and broadly described herein, a mobile terminal includes a touchscreen configured to generate a touch signal by sensing touch input applied to a front surface thereof; a stylus pen having a variable length, the stylus pen comprising a first pen tip provided in an end to touch the front surface of the touchscreen to create a first touch signal; a sensing part configured to sense state variation of the stylus pen including length variation of the stylus pen; and a controller configured to switch an input mode of the touchscreen according to the state variation of the stylus pen sensed by the sensing part, wherein the input mode selects one of a mouse input mode configured to implement a corresponding application or function based on touch of an icon or button output on the touchscreen; a gesture input mode configured to implement a function corresponding to the pattern, in case a preset pattern is input on the touchscreen; and a quick-memo input mode configured to store handwriting characters or figures input on the touchscreen intactly.

The controller may recognize the first touch signal in the mouse input mode, in case the stylus pen is shortened, and the controller may recognize the first touch signal in the quick-memo input mode, in case the stylus pen is extended.

The stylus pen may further include a second pen tip provided in the other end thereof, and when touch input is created with the second pen tip, the touchscreen may generate second touch signal from the first touch signal. The controller recognizes the second touch signal in the gesture input mode, in case the stylus pen is shortened, and the controller recognizes the second touch signal in eraser of the quick-memo input mode, in case the stylus pen is extended.

In the quick-memo input mode, a quick-memo button may be arranged on a predetermined portion of the touchscreen to select the pen type and to store or delete input hand-writing characters or hand-drawing figures, and the controller may control touch input created on the portion where the quick-memo button is arranged to be recognized in a mouse input mode, so as to implement a function of the corresponding button.

The selecting of the pen type may include selecting of one or more of texture, thickness and color or selecting of an eraser.

The controller may control a user's physical touch on the other portion of the touchscreen to be neglected and only the stylus pen touch input on the portion of the touchscreen, where the quick-memo button is arranged, to be recognized in the quick-memo input mode.

The stylus pen may include a rotary portion provided in a predetermined portion of the stylus pen to rotate with respect to a longitudinal direction of the stylus pen, in the quick-memo input mode, the sensing part may sense rotation of the rotary portion and when the rotary portion is rotated, one or more of the changing thickness, changing color, changing texture and selecting an eraser for erasing input hand-writing characters and figures is performed.

The stylus pen may further include a switch provided in an end or a lateral surface thereof, and one or more of the changing thickness, changing color, changing texture and selecting an eraser for erasing input hand-writing characters and figures is performed in the quick-memo input mode, when the switch is pressed.

The stylus pen may be extendible in 3-stages, and the stylus pen may recognize touch input in the mouse input mode in a first stage and the stylus pen may recognize touch input in the gesture input mode in a second stage and the stylus pen may recognize touch input in the quick-memo input mode in a third stage.

The touchscreen may be a capacitive type in which the capacity of the touchscreen is varied and a touch signal is generated based on the variation of the capacity after touch input is implemented on the touchscreen by touch of a conductive material.

The first pen tip may be formed of a conductive material to vary the capacity of the touchscreen.

The controller may restrict touch input created by a user's physical touch on the touchscreen and may control only touch input created with the stylus pen to be recognized.

The mobile terminal may further include a case configured to accommodate a body of the mobile terminal including the touchscreen, the sensing part and the controller, the case having the stylus pen detachably coupled thereto.

When the stylus pen is separated from the case, the controller may restrict touch input created by a user's physical touch on the touchscreen and may control only touch input created with the stylus pen to be recognized.

In case no touch input is created with the stylus pen for a preset time period, the controller may allow the touch input created by the user's physical touch.

The mobile terminal may further include a coupling hole formed in a back side of the case provided in the mobile terminal to couple an end of the stylus pen thereto. In case the stylus pen is coupled to the coupling hole, the controller may allow the touch input created by the user's physical touch.

In case the sensing part senses that the stylus pen is shortened, the touchscreen may display an application or contents associated with multimedia.

In case the sensing part senses that the stylus pen is extended, the touchscreen may share data with the other multimedia device via wireless communication and a screen displayed on the touchscreen may be displayed on the other multimedia device.

According to at least one of the embodiments, the stylus pen is extendible with no auxiliary operation and the input mode of the mobile terminal can be switched. Accordingly, the convenience of inputting to the mobile terminal created with the stylus pen can be enhanced.

Furthermore, the two types of the pen tips provided in the mobile terminal are used in switching the input mode and the mobile terminal can be controlled by using the switch or the rotary portion.

It is to be understood that both the foregoing general description and the following detailed description of the present invention are exemplary and explanatory and are intended to provide further explanation of the invention as claimed.

BRIEF DESCRIPTION OF THE DRAWINGS

The embodiments will be described in detail with reference to the following drawings in which like reference numerals refer to like elements wherein.

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipments, smart phones, digital broadcast receivers, personal digital assistants, laptop computers, portable multimedia players (PMP), navigators and the like.

Figure 1:
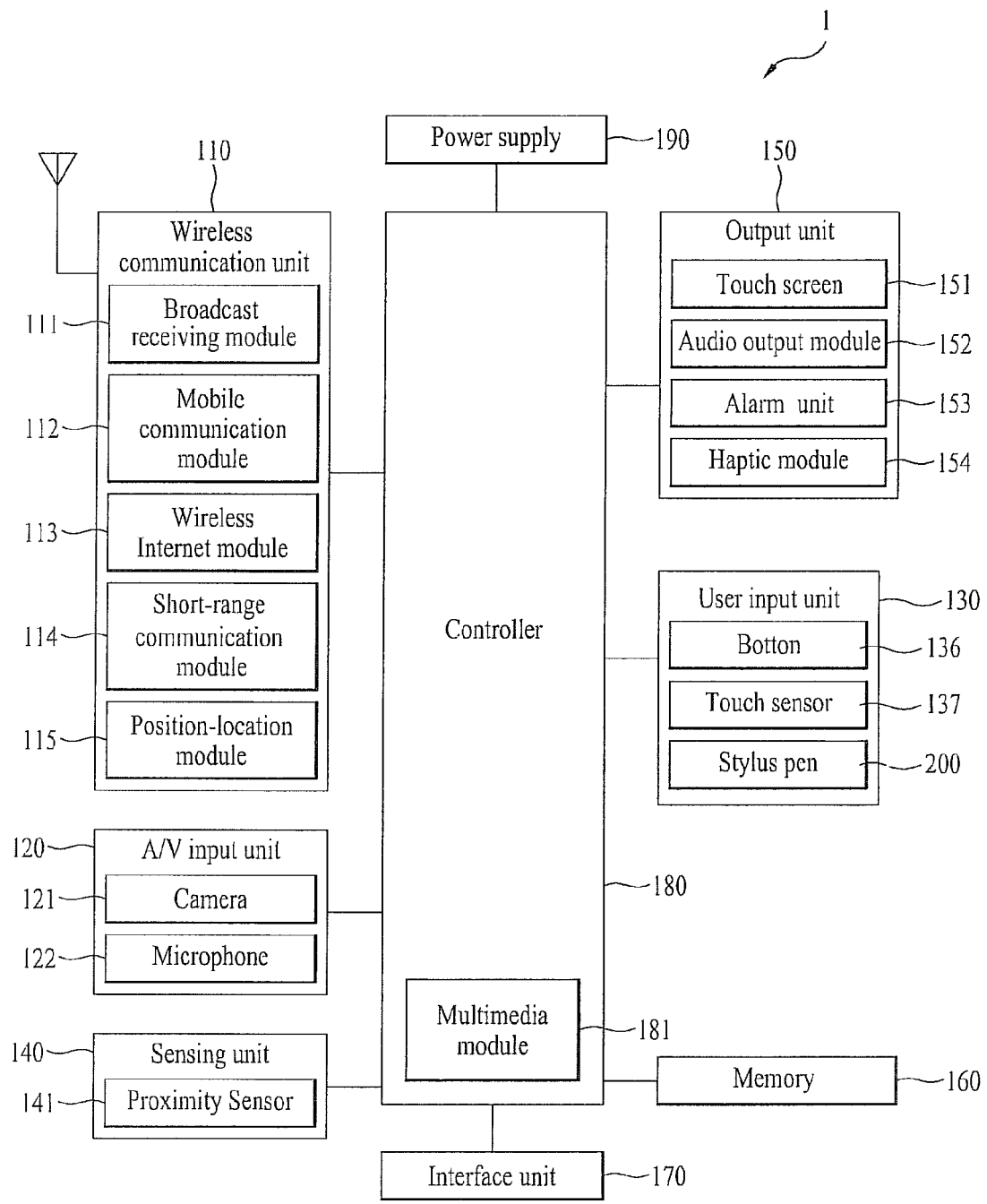
FIG. 1 is a block diagram illustrating a mobile terminal according to one embodiment of the present invention.

FIG. 1 is a block diagram of a mobile terminal 1 in accordance with an embodiment of the present invention. FIG. 1 shows the mobile terminal 1 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 1 having various components, but it is understood that implementing all of the illustrated components is not a requirement. Greater or fewer components may alternatively be implemented.

In the following description, the above elements of the mobile terminal 1 are explained in sequence.

First of all, the wireless communication unit 110 typically includes one or more components which permits wireless communication between the mobile terminal 1 and a wireless communication system or network within which the mobile terminal 1 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. The broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 1. This module may be internally or externally coupled to the mobile terminal 1. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution), etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 1. If desired, this module may be implemented with a global positioning system (GPS) module.

Referring to FIG. 1, the audio/video (A/V) input unit 120 is configured to provide audio or video signal input to the mobile terminal 1. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 1 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 1 and a touch sensor (pressure sensitive touch/capacitive touch) 137 and may further include a key pad, a dome switch, a jog wheel, a jog switch and the like [not shown in the drawing].

The sensing unit 140 provides sensing signals for controlling operations of the mobile terminal 1 using status measurements of various aspects of the mobile terminal. For instance, the sensing unit 140 may detect an open/close status of the mobile terminal 1, relative positioning of components (e.g., a display and keypad) of the mobile terminal 1, a change of position of the mobile terminal 1 or a component of the mobile terminal 1, a presence or absence of user contact with the mobile terminal 1, orientation or acceleration/deceleration of the mobile terminal 1. By nonlimiting example, such sensing unit 140 include, gyro sensor, accelerate sensor, geo-magnetic sensor.

As an example, consider the mobile terminal 1 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 1. For instance, if the mobile terminal is operating in a phone call mode, the display will generally provide a user interface (UI) or graphical user interface (GUI) which includes information associated with placing, conducting, and terminating a phone call. As another example, if the mobile terminal 1 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 1 may include one or more of such displays.

In case that the display 151 and the touch sensor 137 configures a mutual layer structure (hereinafter called 'touch screen'), it is able to use the display 151 as an input device as well as an output device. In this case, the touch sensor can be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 1. Typical events include a call received event, a message received event and a touch input received event. The alarm unit 153 is able to output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output in a manner of being synthesized together or can be output in sequence.

The user input unit 130 generates input data responsive to user manipulation of an associated input device or devices. Examples of such devices include a button 136 provided to front/rear/lateral side of the mobile terminal 1 and a touch sensor (pressure sensitive touch/capacitive touch) 137 and may further include a key pad, a dome switch, a jog wheel, a jog switch and the like [not shown in the drawing].

In addition, the stylus pen 200 is means for generating an input signal via a touch sensor 137. Without using the finger, the user touches the touch screen 151, using the stylus pen 200 and then the touch sensor 137 generates an input signal.

In case of writing or drawing a picture, it is more convenient to use the pen than the finger. When the user's finger is thick or buttons are arranged intense, such an input signal is generated at a point different from a desired point. To solve that, the stylus pen 200 can be used for precise control.

In case the touch sensor 137 is a pressure sensing type, the stylus pen 200 may be a bar type stylus pen 200 having pen tips 220 and 225 that are able to apply a pressure to an appropriate point. In case the touch sensor 137 is a capacitive type, electric currents have to flow to pen tips 220 and 225 provided in the stylus pen 200 and the stylus pen can be entirely or partially formed of a conductive material. The stylus pen 200 will be described in detail later, referring to FIGS. 3 and 4.

The sensing unit 140 provides sensing signals for controlling operations of the mobile terminal 1 using status measurements of various aspects of the mobile terminal. For instance, the sensing unit 140 may detect an open/close status of the mobile terminal 1, relative positioning of components (e.g., a display and keypad) of the mobile terminal 1, a change of position of the mobile terminal 1 or a component of the mobile terminal 1, a presence or absence of user contact with the mobile terminal 1, orientation or acceleration/deceleration of the mobile terminal 1.

As an example, consider the mobile terminal 1 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. Meanwhile, the sensing unit 142 may include a sensor part 142.

The sensor part 142 is a device configured to sense change in states of the stylus pen 200 and it includes a kind of a wireless communication functions. At this time, the change includes change in lengths and profiles of the stylus pen, which will be described when describing the stylus pen, referring to FIGS. 3 and 4.

The memory 160 may be configured to store a program for process and control of the controller 180 therein and to implement a function of temporarily storing input/output data (for example, a contact, a message, auto data, a still image, video data and etc.). A frequency of use for the data (for example, a frequency of usage for each of phone numbers and each of messages) can be stored in the memory 160.

Moreover, data for various patterns of vibration and/or sound output in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 1 is able to operate in association with a web storage for performing a storage function of the memory 160 on Internet.

The interface unit 170 is often implemented to couple the mobile terminal 1 with external devices. The interface unit 170 receives data from the external devices or is supplied with the power and then transfers the data or power to the respective elements of the mobile terminal 1 or enables data within the mobile terminal 1 to be transferred to the external devices.

The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 1 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 1 via the corresponding port.

When the mobile terminal 110 is connected to an external cradle, the interface unit 170 becomes a passage for supplying the mobile terminal 1 with a power from the cradle or a passage for delivering various command signals input from the cradle by a user to the mobile terminal 1. Each of the various command signals input from the cradle or the power can operate as a signal enabling the mobile terminal 1 to recognize that it is correctly loaded in the cradle.

The controller 180 typically controls the overall operations of the mobile terminal 1. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

The controller 180 may implement a pattern recognition process configured to recognize writing input or drawing input created on the touchscreen 151 as characters or images, respectively. Moreover, different input signals are recognized according to pressure variation on the touchscreen 151 or capacity variation of a touch area, to implement other functions.

In addition, the controller 180 may convert an input type of the touchscreen 151 according to state change of the stylus pen 200. When the sensor unit 142 recognizes state change of the stylus pen 200, the controller 180 may implement one of a mouse input mode (M), a gesture input mode (G) and a quick-memo input mode (Q).

Figure 5:
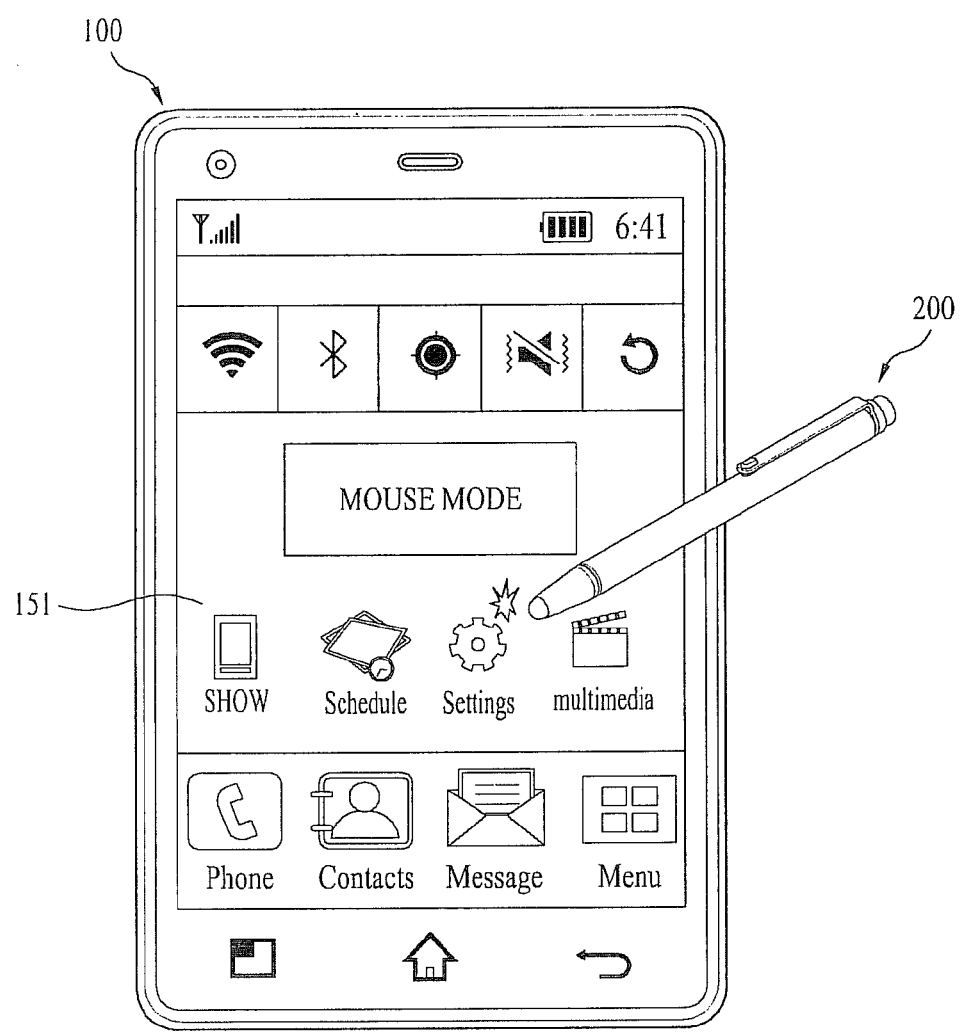
FIGS. 5 and 6 are plane diagrams illustrating a screen in a mouse input mode of the mobile terminal according to the embodiment of the present invention.
Figure 6:
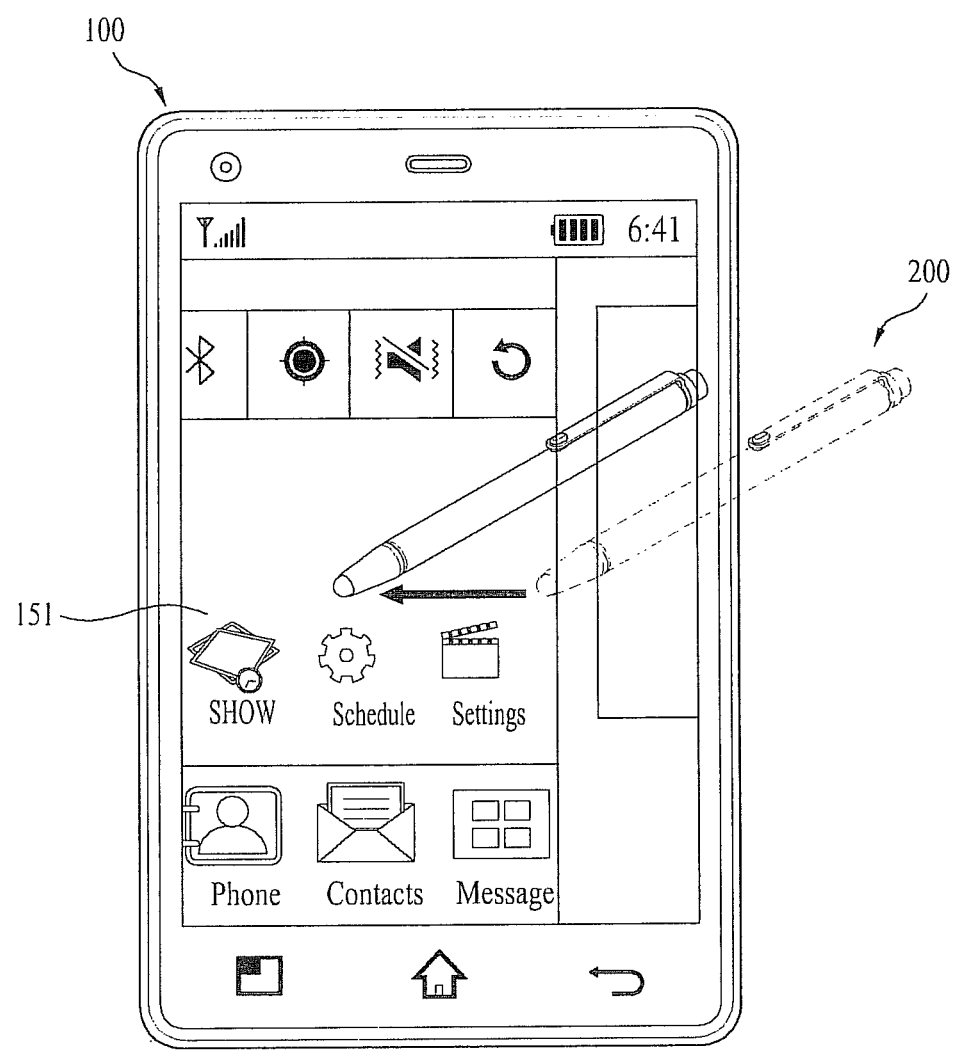

In the mouse input mode (M), an icon or button output on the touchscreen 151 is touched and a corresponding application or function is implemented. FIGS. 5 and 6 show a screen of the mobile terminal in the mouse input mode (M).

Figure 10:
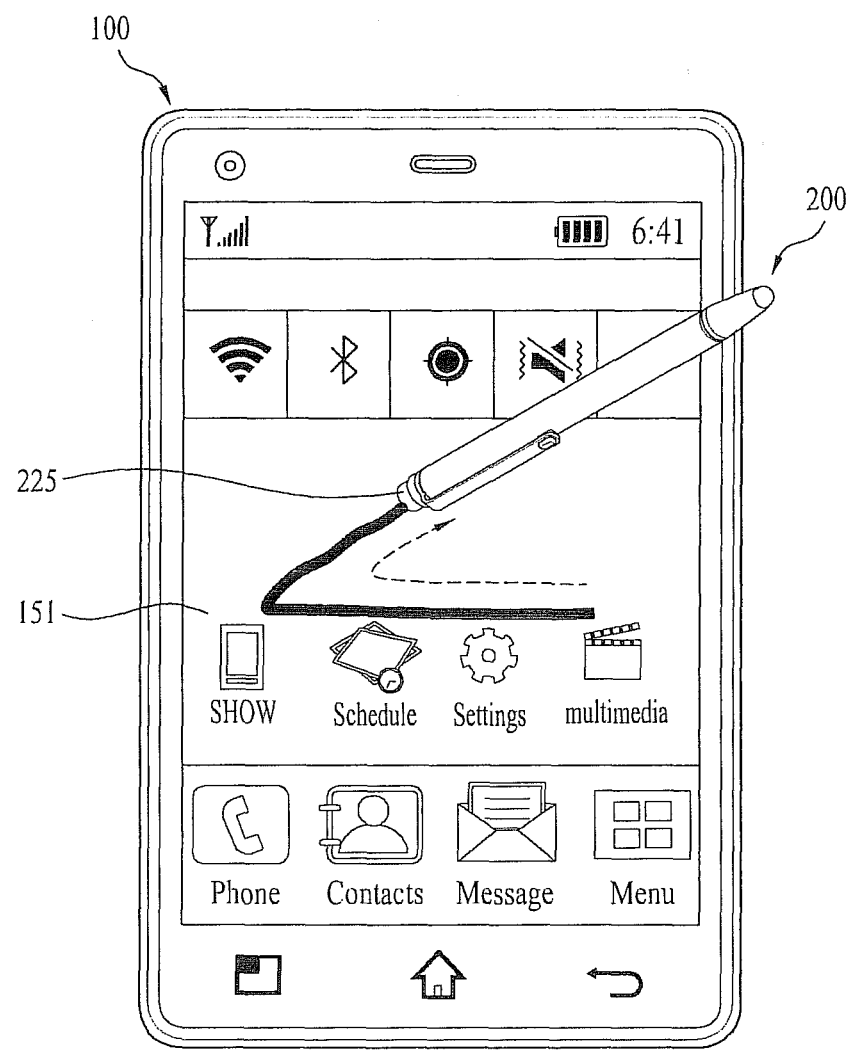
FIGS. 10 and 11 are plane diagrams illustrating a screen in a gesture mode of the mobile terminal according to the embodiment of the present invention.
Figure 11:
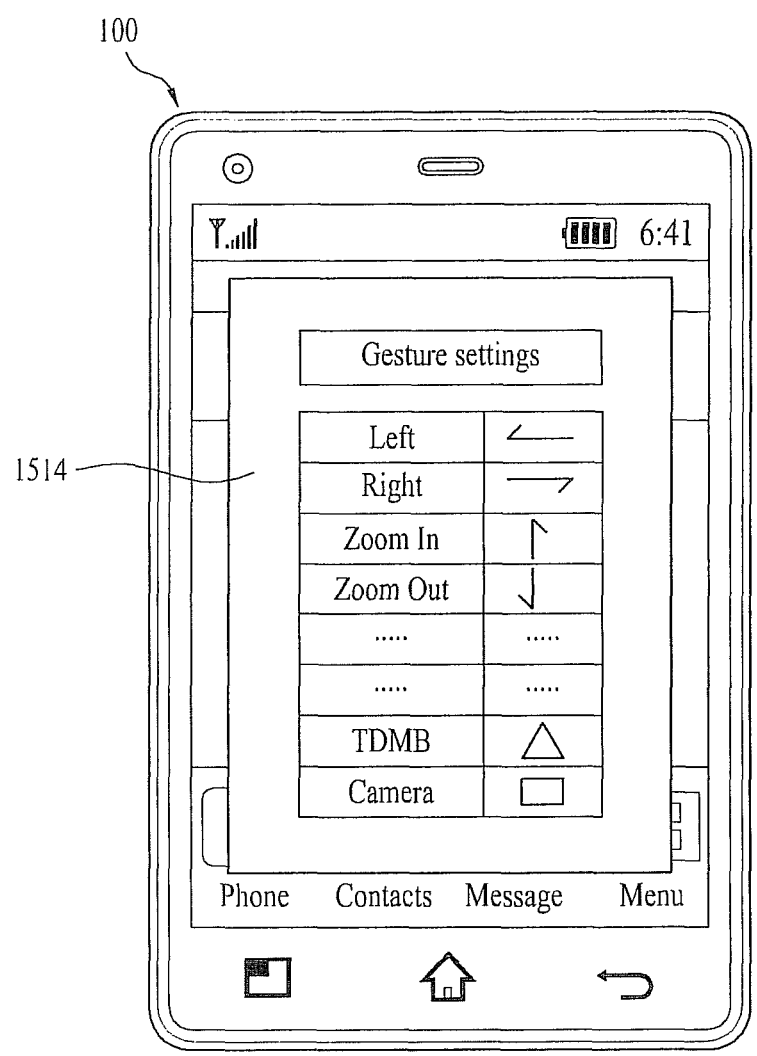
Figure 12:
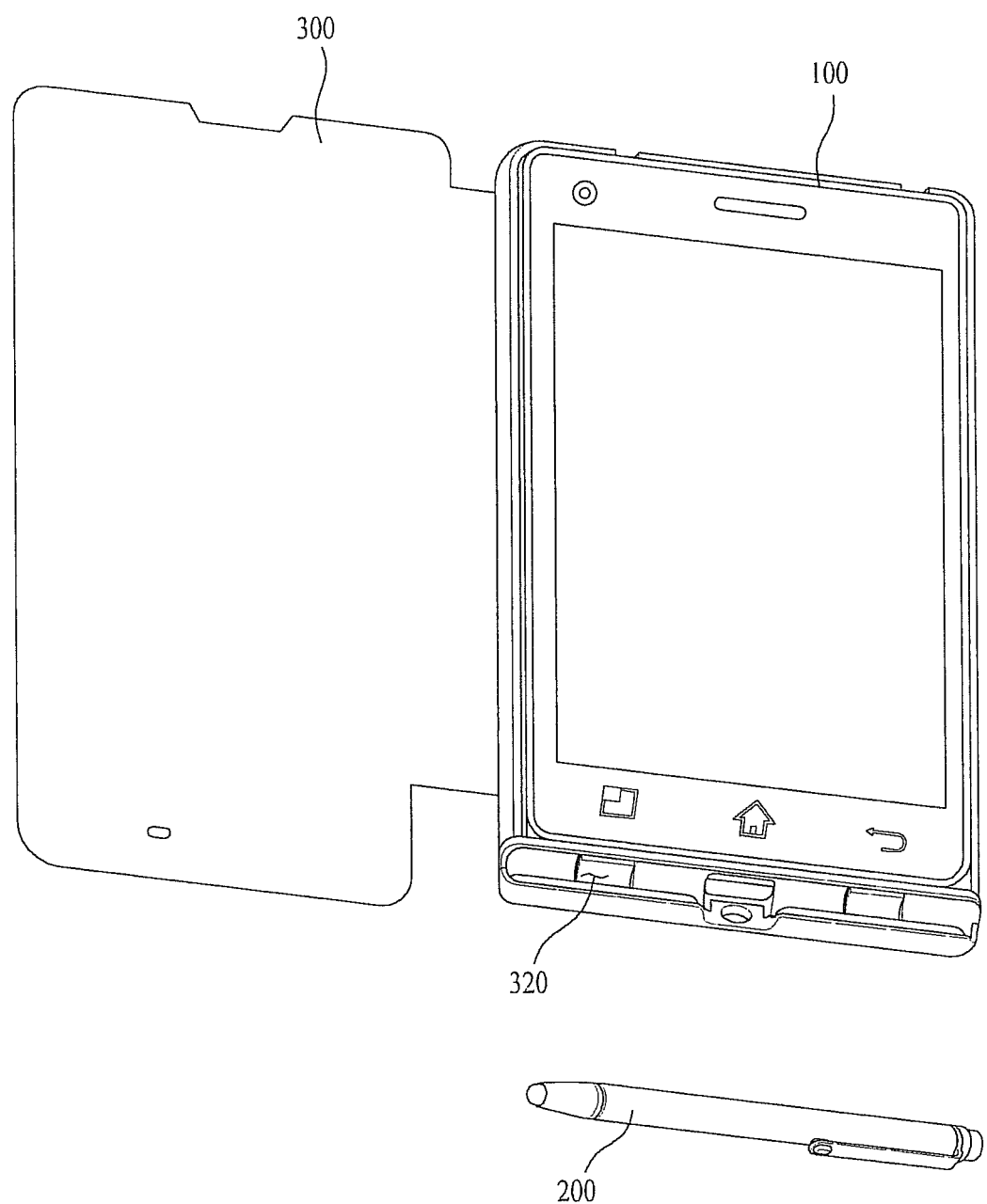
FIG. 12 is a plane diagram illustrating the mobile terminal loaded in a case according to the embodiment of the present invention.

In the gesture input mode (G), a preset pattern on the touchscreen 151 is input and a function corresponding to the input pattern is implemented. In other words, the gesture input mode (G) controls a specific function to match a specific pattern touch input. Once a corresponding pattern is drawn on the touchscreen 151, a matching function such as a keyboard shortcut is implemented. Such the gesture input mode (G) is shown in FIGS. 10 and 11.

Figure 7:
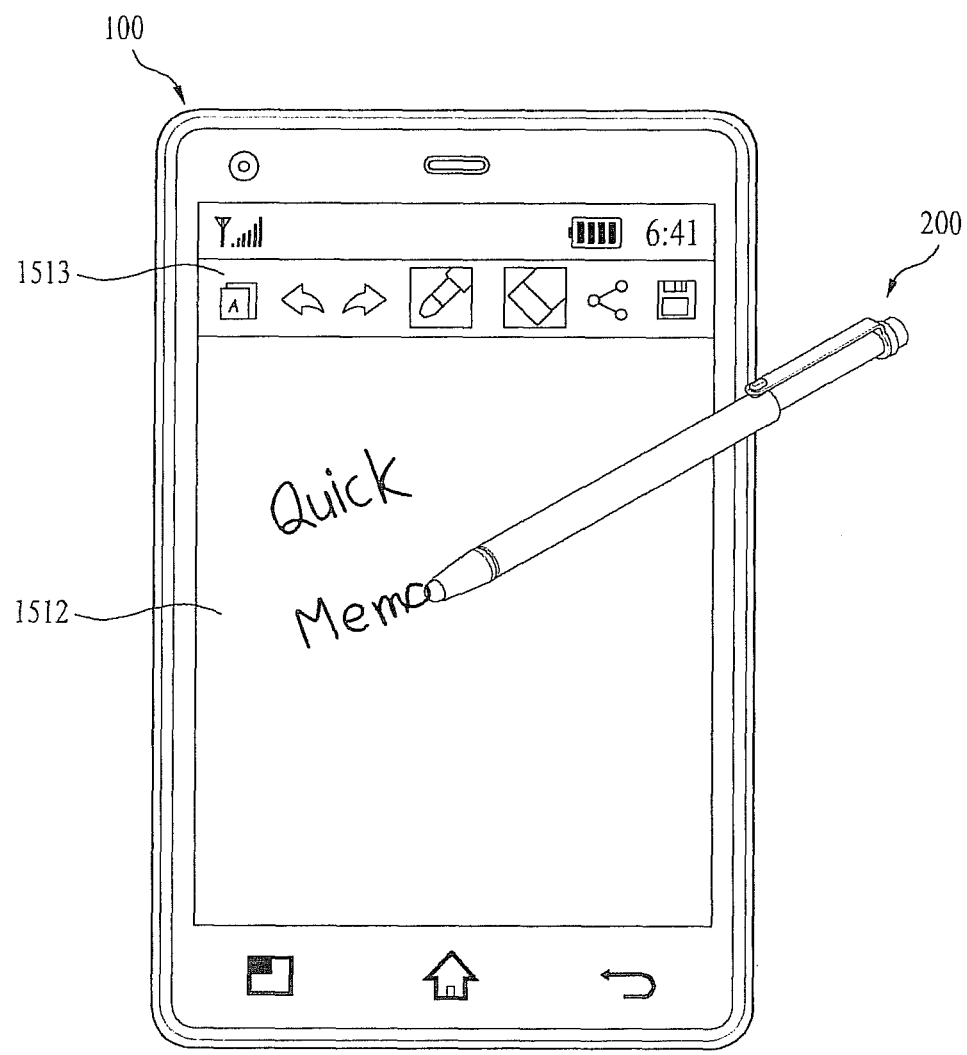
FIGS. 7 to 9 are plane diagrams illustrating a screen in a quick-memo mode of the mobile terminal according to the embodiment of the present invention.
Figure 8:
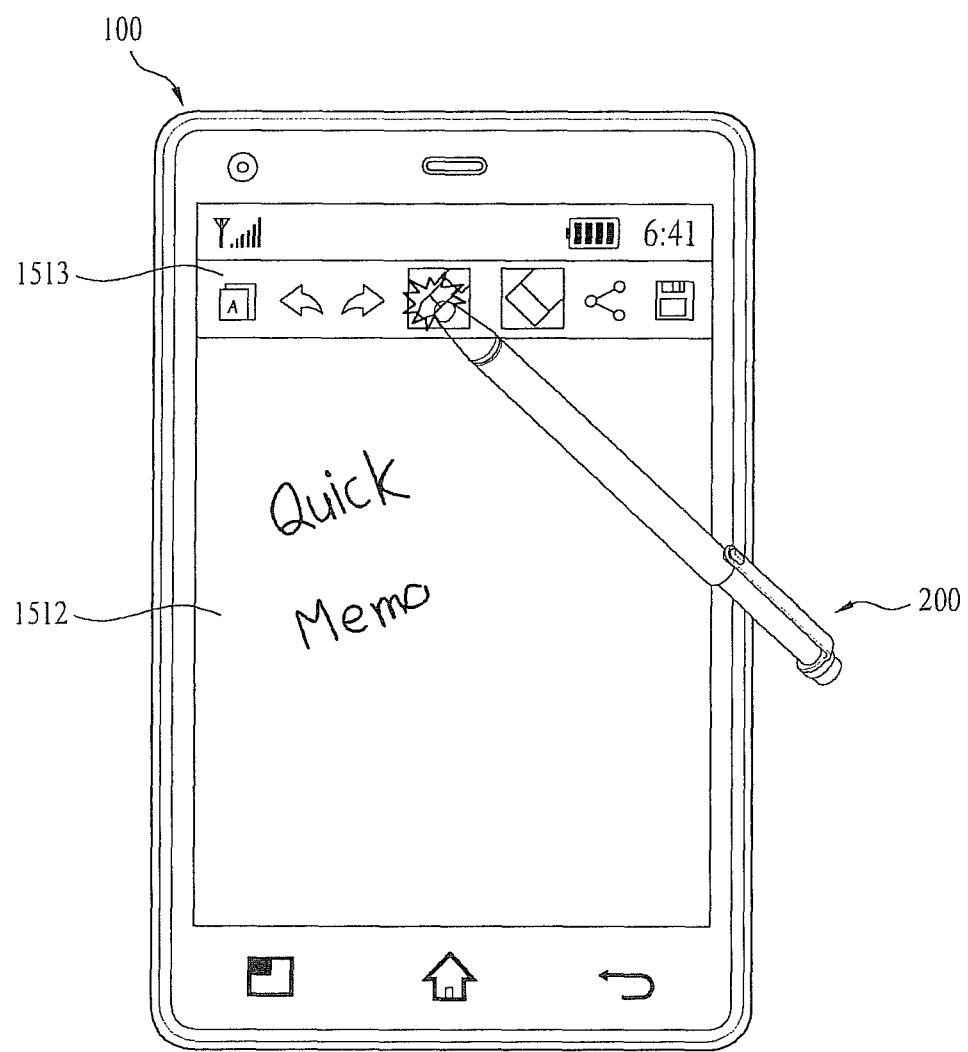
Figure 9:
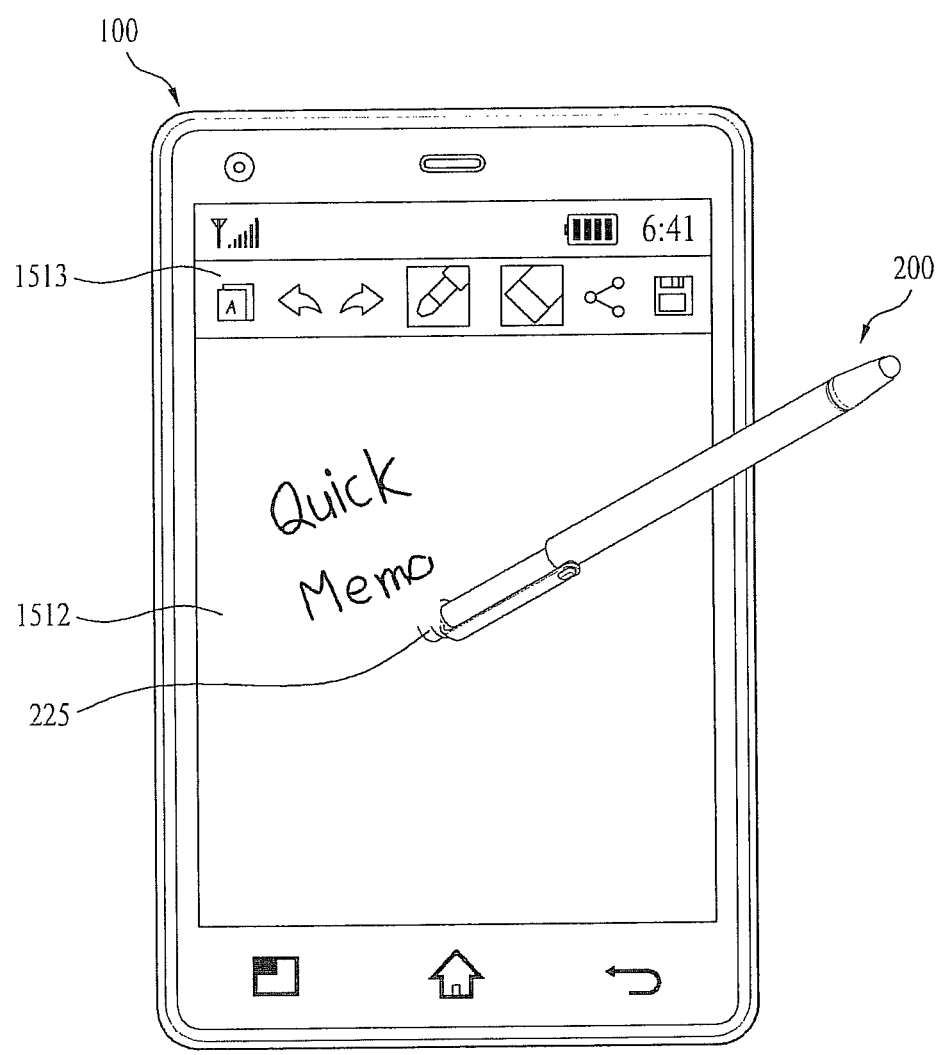

The quick-memo input mode (Q) is shown in FIGS. 7 to 9 and it means an input type configured to store hand writing and figure input on the touchscreen 151 as it is. Without implementing auxiliary applications or inputting characters in a key input method, a memo note where handwriting or pictures are recorded can be realized.

The controller 180 implements one of the three modes according to state change of the stylus pen 200 and a method for controlling each of the modes will be described later.

The power supply unit 190 provides power required by the various components for the mobile terminal 1. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

Figure 2:
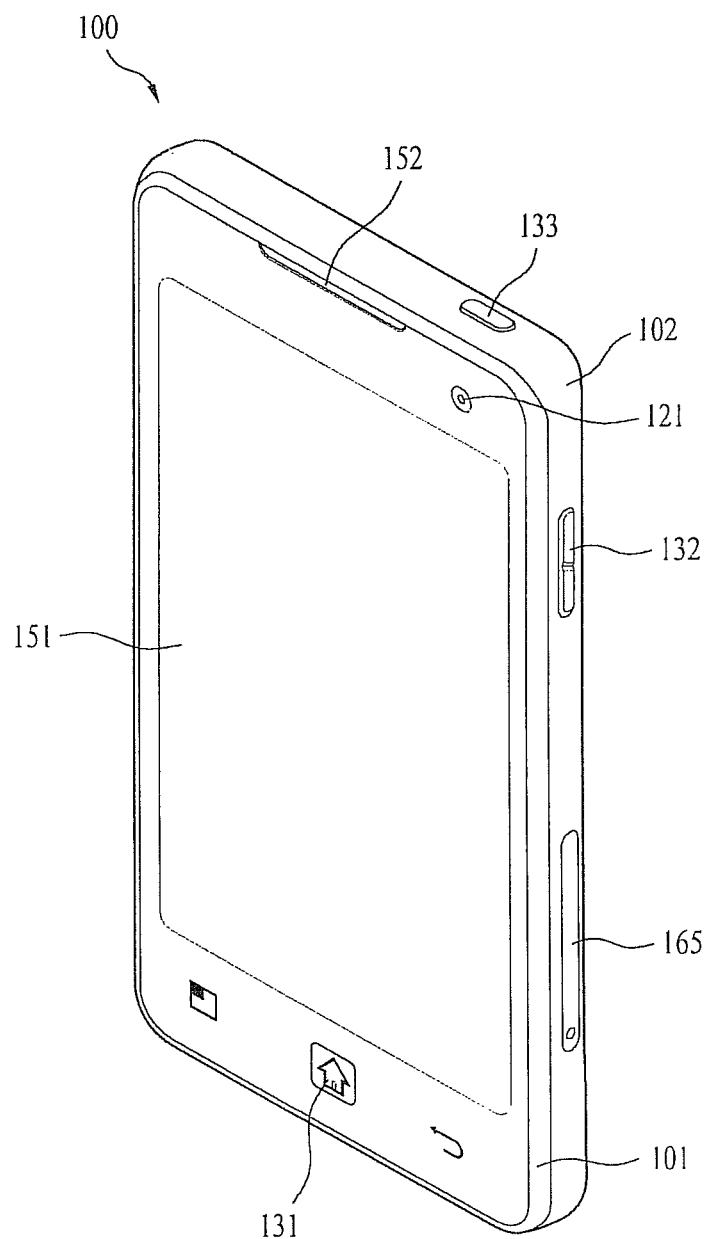
FIG. 2 is a front perspective view illustrating the mobile terminal according to the embodiment of the present invention.

Next, FIG. 2 is a front perspective diagram of a mobile terminal according to one embodiment of the present invention.

The mobile terminal 1 shown in the drawing has a bar type terminal body. Yet, the mobile terminal 1 may be implemented in a variety of different configurations. Examples of such configurations include folder-type, slide-type, rotational-type, swing-type and combinations thereof. For clarity, further disclosure will primarily relate to a bar-type mobile terminal 1. However such teachings apply equally to other types of mobile terminals.

Referring to FIG. 2, the mobile terminal 1 includes a case 101, 102, 103 configuring an exterior thereof. In the present embodiment, the case can be divided into a front case 101 and a rear case 102. Various electric/electronic parts are loaded in a space provided between the front and rear cases 101 and 102.

The housing may include an opening to insert detachable components such as an auxiliary storage media 165 therein from outside. Such an auxiliary storage media 165 may include the USIM card or the memory card. A slot may be formed in a lateral surface of the housing to insertedly load the auxiliary storage media 165 via a lateral surface of the mobile terminal 1 and a card slot may be formed to load the auxiliary storage media 165 in a surface of the rear housing 102.

The cases 101, 102 and 103 can be formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 170 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152 and the like can be input to the second manipulating unit 132, a command for a switching to a touch recognizing mode of the display 151 and the like can be input to the second manipulating unit 133.

A button type is configured to recognize a pressure applied by a user to each of the manipulation units 131, 132 and 133. If a touch sensor is provided to each of the manipulation units 131, 132 and 133 in addition to the display unit 151, a user's command can be inputted by a user's touch.

Figure 3:
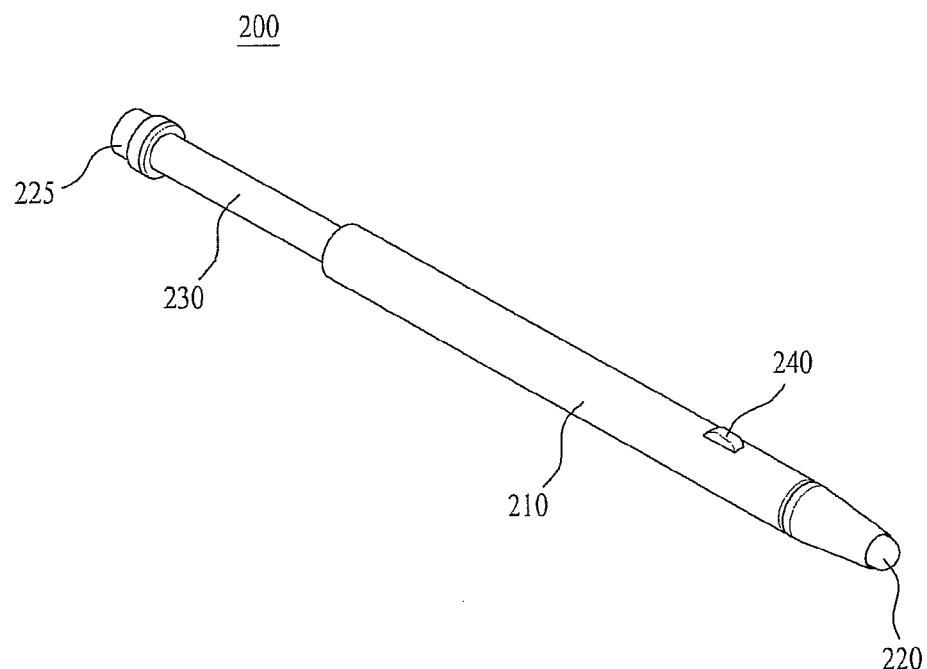
FIG. 3 is a perspective view illustrating a stylus pen according to one embodiment of the present invention.
Figure 4:
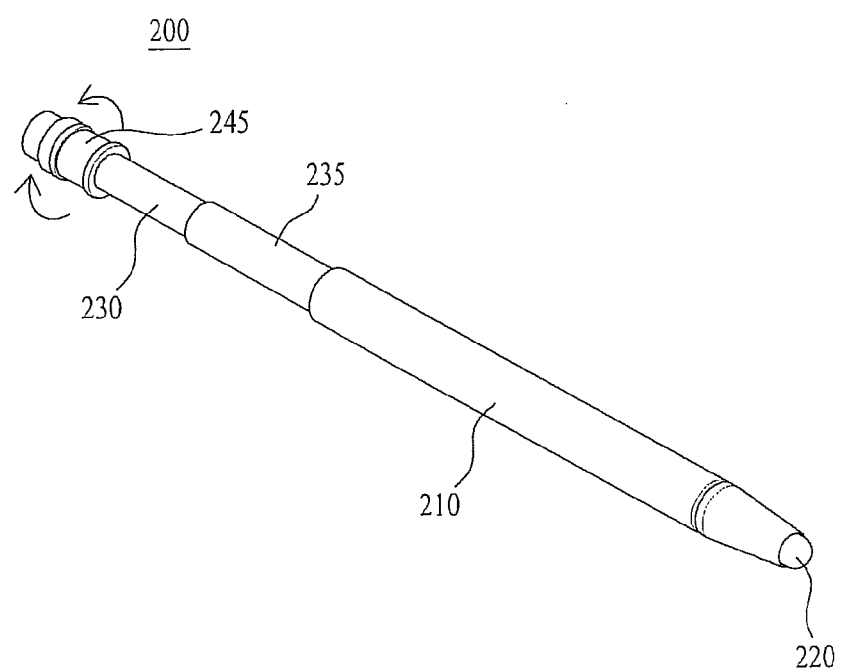
FIG. 4 is a perspective view illustrating a stylus pen according to another embodiment.

FIGS. 3 and 4 are perspective diagrams illustrating an embodiment of the stylus pen 200 according to the present invention. The stylus pen 200 according to the present invention is the device configured to implement touch input after contacting with the touchscreen 151 of the mobile terminal mentioned above and it includes the basic structure that consists of a bar-shaped pen body and a pen tip coupled to an end of the pen body to contact with the touchscreen 151.

In case the touchscreen 151 is a piezoelectric type, the stylus pen includes a pen tip that is able to implement touch input at a precise point when pressing the touchscreen 151, with no scratch on the touchscreen 151. In case the touchscreen 151 is a capacitive type, the stylus pen 200 includes a conductive pen tip that is able to change the capacity of the touchscreen 151.

The pen tip can be provided in one end of the stylus pen 200 or each end of the stylus pen 200. For convenience sake, a pen tip provided in one end of the stylus pen may be referenced to as 'a first pen tip 220' and another pen tip provided in the other end may be referenced to as 'a second pen tip 225'. The pen tip may be integrally formed with the stylus pen or it may be formed of a soft silicon or rubber material to be assembled with a pen body of the stylus pen 200.

The mobile terminal can distinguish the first pen tip 220 and the second pen tip 225 from each other. In other words, the thickness of the first pen tip 220 may be different from that of the second pen tip 225 or the material used in the first pen tip 220 may be different from the material used in the second pen tip 225 to differentiate capacity change generated when the first and second pen tips contacts with the touchscreen 151. The controller 180 of the mobile terminal 1 can recognize whether the one touching the touchscreen 151 is the first pen tip 220 or the second pen tip 225.

The stylus pen 200 according to the present invention may be extendible for hand-carry convenience. The extendible length can be extendible in two stages as shown in FIG. 3 or in three stages or more. For explanation convenience sake, the two-stage extendible stylus pen 200 will be described as follows.

The body of the stylus pen 200 is configured of a first pen body 210 having a pipe shape and a second pen body 230 insertedly coupled to the first body 210 to be retractable from the first body 230. A cross section of the pipe shape may be circular to polygonal and the second pen body 230 is a column-shaped or pipe-shaped material that is able to be inserted in the first pen body 210.

When the length of the stylus pen 200 is varied, an electrical signal is generated and the generated electrical signal is transmitted to the body of the mobile terminal via a wireless communication device. Alternatively, in case the touchscreen 151 is a capacitive type, the amount of electric currents flowing to the pen tip 220 and 225 may be artificially varied to differentiate the capacity variation generated in the touchscreen 151 when the pen tip 220 and 225 touches the touchscreen 151.

To implement the former type, the stylus pen 200 is provided with a wireless communication device and the sensing part 142 provided in the mobile terminal is the device configured to receive an electrical signal transmitted from the wireless communication device of the stylus pen 200.

To implement the latter type, no auxiliary wireless communication device need to be provided and the state of the pen can be sensed according to variation of the capacity generated when the stylus pen 20 touches the touchscreen 151. In this instance, the sensing part 142 may be the device configured to determine the state of the pen by sensing the variation of the capacity.

The stylus pen 200 may further include a switch 240. The switch 240 may be positioned in a lateral surface of the stylus pen 200. Alternatively, the switch 240 may be positioned in a rear end of the stylus pen 200 to be pressed once the rear end of the stylus pen 200 is pressed. Once this switch 240 is pressed, a signal is generated and the switch 240 returns to an original position to generate a signal repeatedly.

The stylus pen 200 may further include a rotary portion 245. The rotary portion 245 may be an auxiliary member provided in a middle portion of the pen body of the stylus pen 200 as shown in FIG. 4 or the second pen body 230 may be rotatable with respect to the first pen body 210 as shown in FIG. 1. Such the rotary portion 245 may generate a signal when it is rotated, similar to the switch 240 mentioned above, or it may be selectively provided.

The electrical signal generated when the length of the stylus pen 200 is varied or the signal generated when the switch 240 is pressed or the rotary portion 245 is rotated may be transmitted to the mobile terminal. Accordingly, the stylus pen 200 may include a wireless communication device that is able to electrically communicate with the mobile terminal.

The sensing part 142 of the mobile terminal may sense the state variation of the stylus pen 200 including the length variation of the stylus pen 200, the rotation of the rotary portion 245 and the pressing of the switch 240. In other words, the sensing part 142 may receive the signal for the state variation of the stylus pen 200 from the wireless communication device mentioned above to transmit the signal to the controller 180, such that the controller 180 may set the input type according to the state of the stylus pen 200.

The controller 180 selects one of the mouse input mode (M), the gesture input mode (G) and the quick-memo input mode (Q) to implement the set input type set based on the state of the stylus pen 200. The input type can be differently set based on the length variation of the stylus pen or the kind of the pen tip.

According to one embodiment, when the length of the pen is varied in two stages as shown in FIG. 3, the touch input generated by touch of the first pen tip 220 in a first stage on the touchscreen 151 may be recognized as the mouse input mode (M) and the touch input generated by touch of the first pen tip 220 at a second stage on the touchscreen 151 may be recognized as the quick-memo input mode (Q). The touch input created with the second pen tip 225 in the first stage on the touchscreen 151 may be recognized as the gesture input mode (G) and the touch input created with the second pen tip 225 in the second stage may be recognized as an eraser mode.

According to another embodiment, when the length of the stylus pen is variable in 3-stages as shown in FIG. 4, the touch input of the pen tip in a first stage is recognized as the mouse input mode (M) and the touch of the pen tip in a second stage is recognized as the gesture input mode (G). In addition, the touch input of the pen tip in a third stage may be recognized as the quick-memo input mode (Q). The first stage is a state of the shortest length and the second stage is a stage of the intermediate length. The third stage is a state of the largest length or vice versa.

For convenience sake, the present invention will adapt the former embodiment that the input mode is varied according to which one of the first and second pen tip 220 and 225 extendible in 2-stages is used. However, the present invention is not limited thereto and the input types are selectively implemented according to the length variation and the shape variation of the stylus pen 200.

FIGS. 5 and 6 are plane diagrams illustrating a screen in the mouse input mode (M) of the mobile terminal according to one embodiment of the present invention. In a state where the length of stylus pen 200 is changed short or short, the touchscreen 151 of the mobile terminal is touched and a message of implementing the input in the mouse input mode (M) may be output on the touchscreen.

In the mouse input mode (M), when an icon 1511 output on the touchscreen 151 is touched, similar to the conventional touching method using the touchscreen 151 of the conventional mobile terminal, a corresponding application is implemented. Alternatively, when a button output on the touchscreen 151 is pressed or a menu output on the touchscreen is selected, a relating function is implemented.

In addition, as shown in FIG. 6, in the mouse input mode (M), a line is drawn with the pen in a right-and-left or up-and-down direction and the screen is moving in a right-and-left or up-and-down direction.

FIGS. 7 to 9 are plane diagrams illustrating a screen in the quick-memo input mode (Q) of the mobile terminal according to one embodiment of the present invention. In the quick-memo input mode (Q), the picture drawn with the stylus pen 200 on the touchscreen 151 of the mobile terminal is stored as it is, like a conventional memo note written with a pen, and no characters need to be input via a keypad and a picture can be drawn, such that the quick-memo input mode (Q) may be useful.

In the quick-memo input mode (Q), the figure or characters drawn or written with the stylus pen 200 may be recorded intactly, regardless of the icon or menu output on the screen of the mobile terminal. An opaque memo pad may be output on the screen or semitransparent memo pad is output on the screen, with a memo pad that is partially seen.

The quick-memo input mode (Q) is implemented when the screen of the touchscreen 151 is touched with the stylus pen 200 is extended or in an extended state. A quick-memo button 1513 may be provided in a predetermined portion of the touchscreen 151 to implement a function of changing the type of the pen, functions of storing and deleting in the quick-memo input button (Q).

As shown in FIG. 8, the portion where the quick-memo button 1513 is output may recognize the touch input as the mouse input mode (M) to implement the function of the touched button. The quick-memo button 1513 may include an eraser selecting button, a deleting button, a storing button and an implementation undo button.

The pen type selecting button may select one or more of texture, thickness, color. With no auxiliary eraser button, the pen type selecting button may select an eraser as one of the pen types.

As mentioned above, the stylus pen 200 may further include the switch 240 or the rotary portion 245. The switch 240 may be arranged in the lateral surface or rear end of the stylus pen 200. The user can change the pen type, which will be used in the quick-memo when the electrical signal is generated, by pressing the switch 240 or rotating the rotary portion 245. Such the electrical signal may be transmitted to the main body of the mobile terminal via the wireless communication device of the stylus pen 200.

In the quick-memo input mode (Q), the user's hand might contact with a memo-writing portion 1512 as if he or she writes a note with a conventional pen. In this instance, it is difficult to write characters in the quick-memo input mode (Q) and to solve that, the controller 180 controls only the input created with the stylus pen 200 to be recognized in the quick-memo input mode (Q), with ignoring touch input created by the user's physical contact with the button.

At this time, in case the quick-memo button 1513 is positioned in an upper portion of the touchscreen not reached by the user's hand, the touch input created by the user's physical contact need not be restricted. Only the quick-memo button 1513 is controlled to recognize the touch input created by the user's physical contact.

When touch is input on the touchscreen 151 with the second pen tip 25 positioned in the other end of the stylus pen 200 in a state of extended longitudinally as shown in FIG. 9, the screen is controlled to be automatically switched into an eraser mode. In the eraser mode, the stylus pen 200 can be used as a pen with an eraser.

FIGS. 10 and 11 are plane diagrams illustrating a screen of the mobile terminal in the gesture input mode (G) according to one embodiment of the present invention. In case touch is input with the second pen tip 225 positioned in the rear end of the short stylus pen 200, the screen is switched into the gesture input mode (G). In the gesture input mode (G), a pattern drawn with the stylus pen 200 by the user matches a specific function as mentioned above. Once a specific pattern is drawn, the matched function is controlled to be implemented.

The matching between the pattern and the function may be designated as a default. Alternatively, as shown in FIG. 11, the user may set the matching as a random value. Compared with the touch created with the user's hand, the touch created with the stylus pen 200 cannot perform the double touch input configured to input a command by using two fingers. It is useful to set a gesture function for a function that requires the touch input such as enlarging and reducing.

As mentioned above, the input created by the user's physical touch can be limited in the other input modes as well as the quick-memo input mode (Q), in case the touch input is implemented with the stylus pen 200.

The starting of the input mode created with the stylus pen 200 may mean that the sensing part 142 of the mobile terminal senses the length variation of the pen. Alternatively, it may mean that the length variation is transmitted to the sensing part 142 via the wireless communication device of the stylus pen 200 or that the stylus pen 200 touches the touch screen 151.

The starting of the input mode created with the stylus pen 200 can be set by the user. In case of no input created with the stylus pen 200 for a preset time period, even with restricting the input created by the user's physical touch, the controller 180 may control the user's physical touch input to be recognized.

Next, referring to FIGS. 12 to 18, a method for controlling the mobile terminal in case the mobile terminal includes the mobile terminal body 100 and the case 300 that can mount the stylus pen 200 therein. The mobile terminal may further include a pen accommodating groove 320 to accommodate the stylus pen 200.

When the stylus pen accommodating groove 320 is provided in the mobile terminal, the risks of losing the stylus pen 200 can be reduced and hand-carry convenience can be enhanced. In addition, when the stylus pen 200 is separated from the stylus pen accommodating groove 320, the mobile terminal can recognize that the stylus pen 200 will be used and control to neglect the touch input created by the user's body part.

Even in this instance, when no touch input created with the stylus pen 200 is recognized for a preset time period, the restriction of the touch input created by the user's body part can be released to recognize the user's body part touch input.

Figure 13:
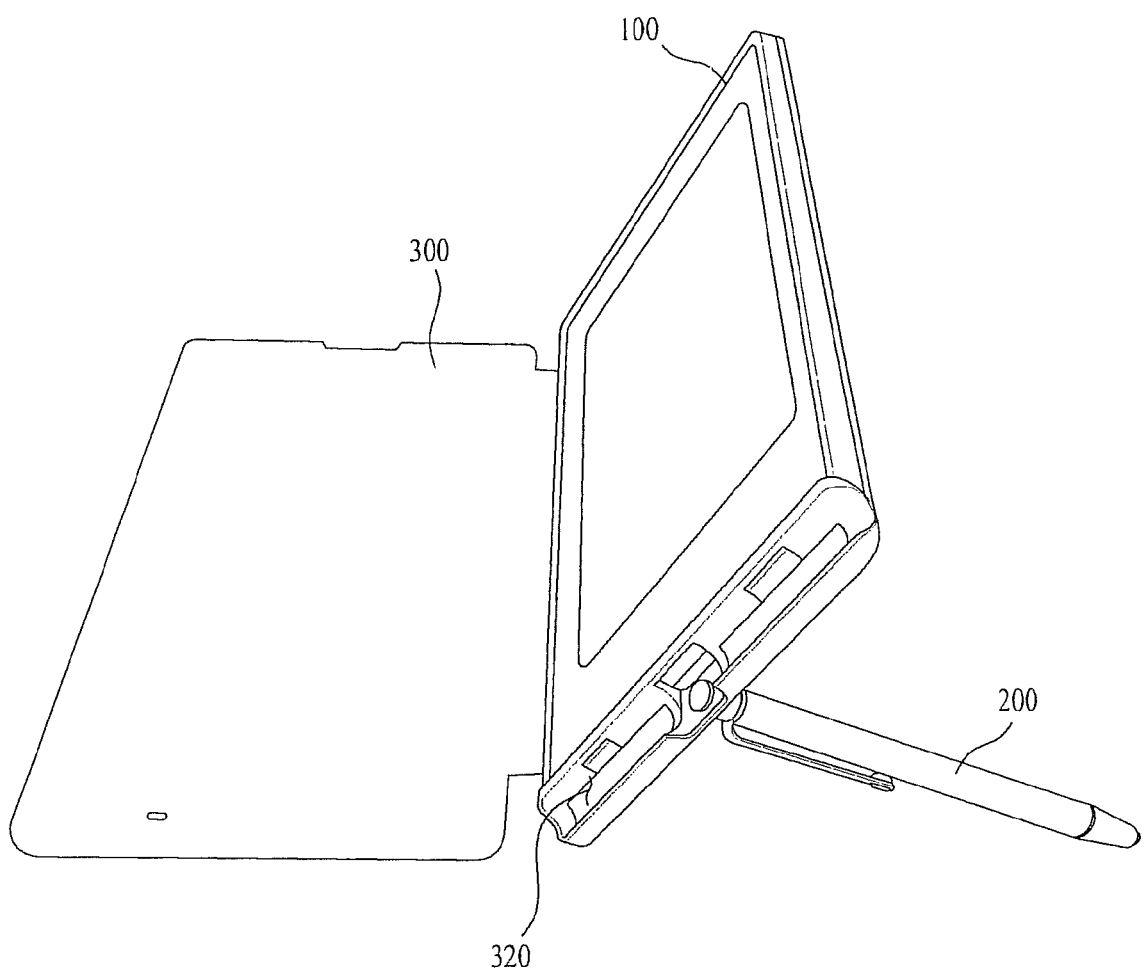
FIG. 13 is a perspective diagram illustrating the mobile terminal supported by using the stylus pen according to the embodiment of the present invention.

A coupling groove 325 may be further provided in a back side of the mobile terminal to couple the end of the stylus pen 200 thereto. As shown in FIG. 13, when the stylus pen accommodating groove 325 is provided, the coupling hole 325 may be provided in a bottom of the stylus pen accommodating groove 320. When the user separates the stylus pen 200 from the stylus pen accommodating groove 320 to use it, an empty space is formed in the stylus pen accommodating groove 320 and the end of the stylus pen 200 can be coupled thereto.

Figure 14:
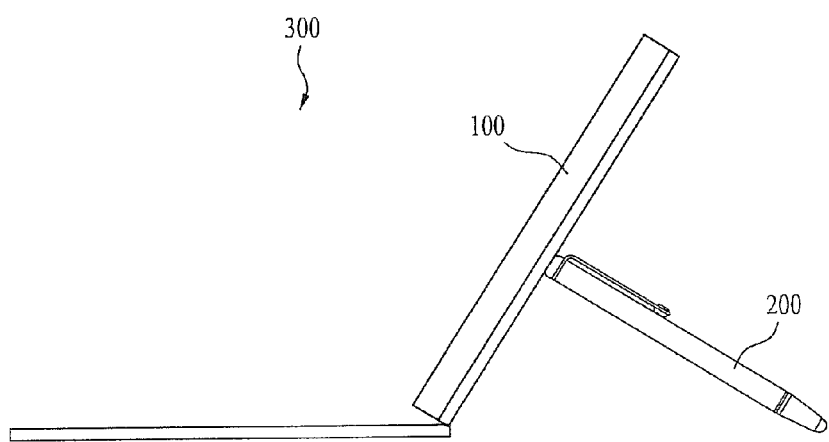
FIG. 14 is a side sectional diagram illustrating a supported state of a mobile terminal according to one embodiment of the present invention.

Once the end of the stylus pen 200 is coupled to the coupling hole 325, the mobile terminal can be held obliquely as shown in FIG. 13. At this time, the end of the stylus pen 200 may be coupled to the coupling hole in a state where the stylus pen 200 is in a short length and the mobile terminal is held after that as shown in FIG. 14. Alternatively, the mobile terminal may be held in a state where the stylus pen 200 is extended longest as shown in FIG. 16.

When using a multimedia function, the short stylus pen 200 is inserted in the coupling hole 325 to support the mobile terminal. The mobile terminal supported by the stylus pen 200 is tilted a predetermined angle that makes it easy for the user to see a motion picture output on the screen. In other words, once the sensing part 142 senses that the stylus pen 200 inserted in the coupling hole 325 is short, the touchscreen

Figure 15:
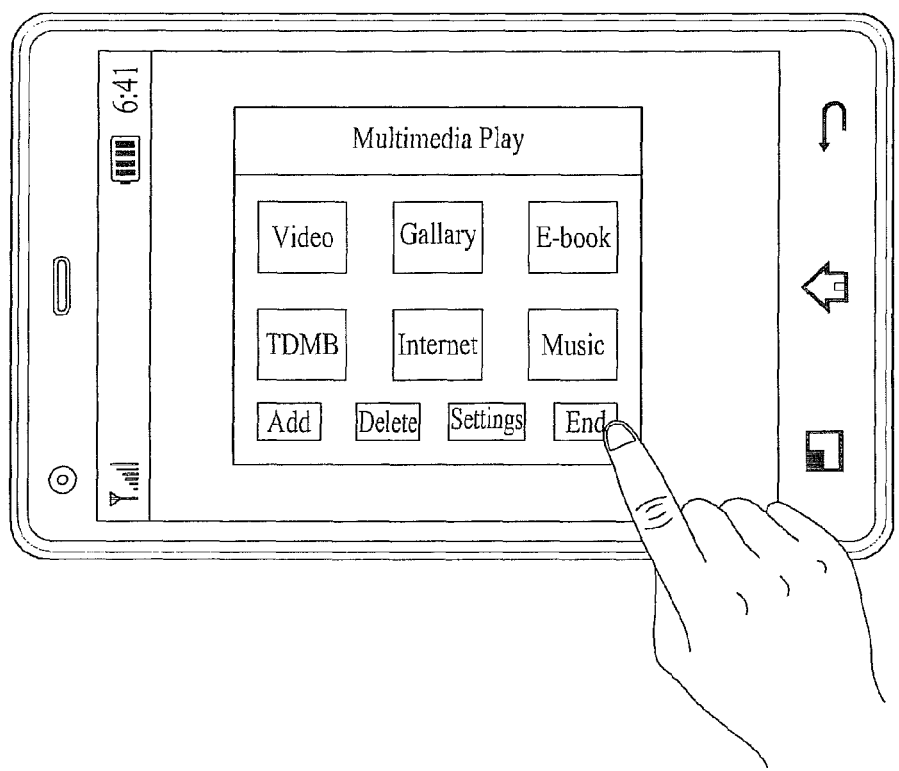
FIG. 15 is a plane diagram illustrating a screen of the mobile terminal shown in FIG. 14.

151 may be controlled to output an application or contents associated with the multimedia as shown in FIG. 15.

Figure 16:
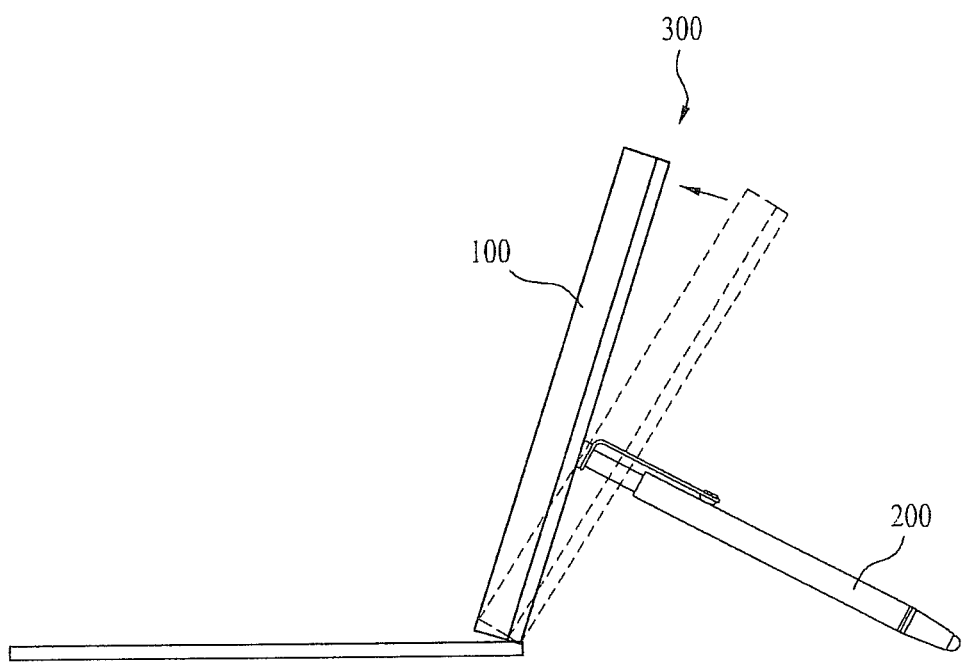
FIG. 16 is a side sectional diagram illustrating a supported state of a mobile terminal according to one embodiment of the present invention.
Figure 17:
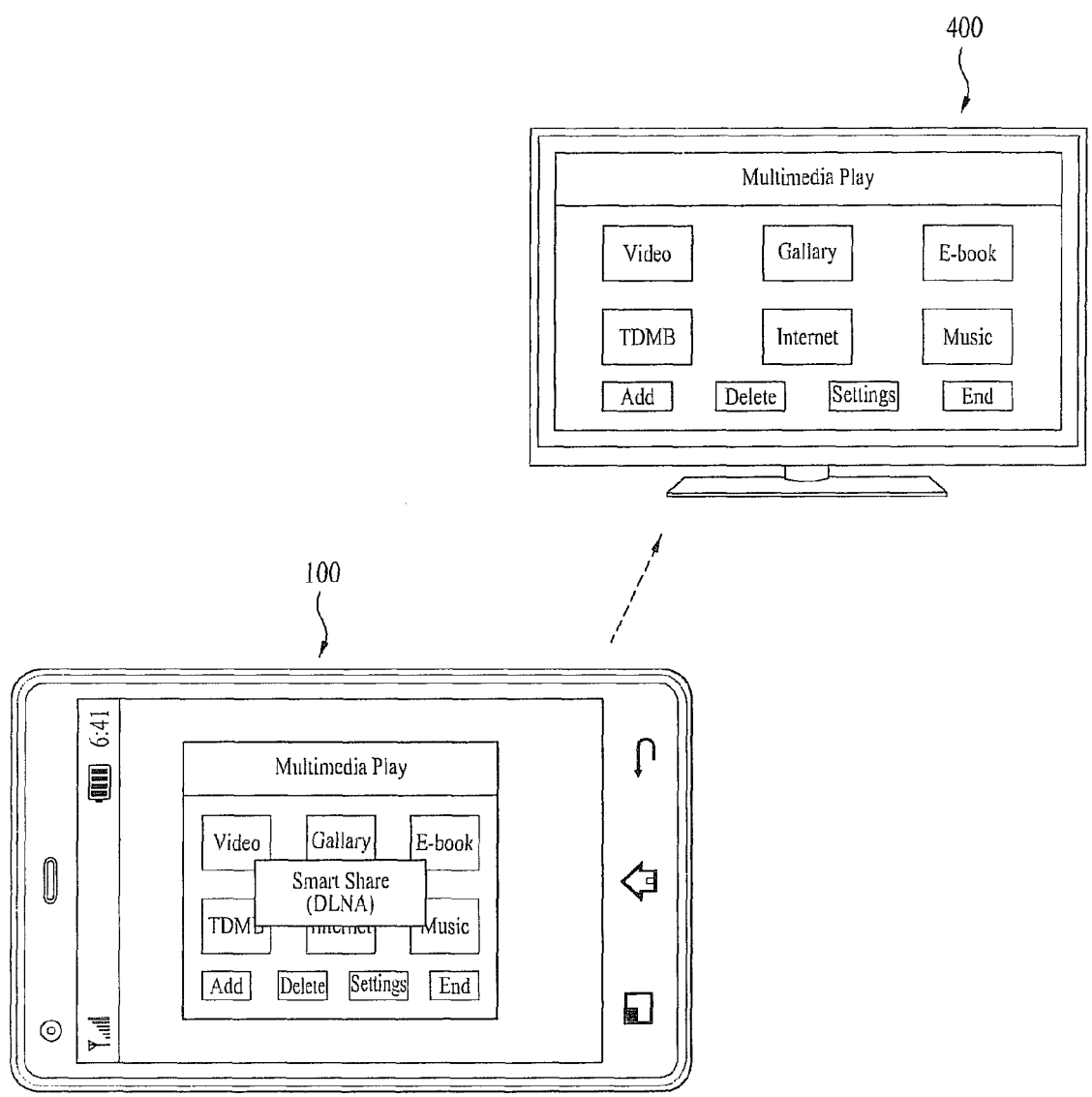
FIG. 17 is a plane diagram illustrating a screen of the mobile terminal shown in FIG. 16.

In contrast, as shown in FIG. 16, when the long stylus pen 200 is inserted in the coupling hole 325, the tilted angle of the mobile terminal with respect to the stylus pen 200 may be almost perpendicular and it is inappropriate to see the multimedia output on the screen of the mobile terminal tilted perpendicularly with respect to the stylus pen 200. At this time, the touchscreen 151 shares data with the other multimedia device 400 via wireless communication such that the data output on the touchscreen 151 may be controlled to be output on the multimedia device 400.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
    a touchscreen having a plurality of separate input modes;
    a stylus pen having a variable length, the stylus pen including one or two tips at ends for a touch input on the touchscreen;
    a sensing part configured to sense a state variation of the stylus pen, wherein the state variation includes a length variation of the stylus pen; and
    a controller configured to change from a first one of the input modes to a second one of the input modes based on the sensed state variation of the stylus pen,
    wherein the input modes of the touchscreen include at least two of the followings:
    a mouse input mode to implement a corresponding application or a corresponding function based on the touch input on the touchscreen,
    a gesture input mode to implement a function corresponding to the touch input having a preset pattern, and
    a quick-memo input mode to store characters or figures provided by the touch input.

2. The mobile terminal according to claim 1, wherein when the stylus pen is in a first stage length, the controller recognizes the touch input to the touchscreen and provides the touchscreen in the mouse input mode, and
    when the stylus pen is in a second stage length, the controller recognizes the touch input to the touchscreen and provides the touchscreen in the quick memo mode.

3. The mobile terminal according to claim 2, wherein when the stylus pen is in a third stage length, the controller recognizes the touch input to the touchscreen and provides the touchscreen in the gesture input mode.

4. The mobile terminal according to claim 1, wherein the stylus pen includes:
    a first tip at a first end for providing a first touch input on the touch screen, and a second tip at a second end for providing a second touch input on the touch screen.

5. The mobile terminal according to claim 4, wherein when the stylus pen is in the first stage length, the controller recognizes the first touch input to the touchscreen and provides the touchscreen in the mouse input mode, and
    the controller recognizes the second touch input to the touchscreen and provides the touchscreen in the gesture input mode, and
    wherein when the stylus pen is in a second stage length, the controller recognizes the first or the second touch input to the touchscreen and provides the touchscreen in the quick memo input mode.

6. The mobile terminal according to claim 4, wherein when the controller recognizes the first touch input to the touchscreen in the quick memo input mode, the controller stores characters or figures input by the first touch input, and
    wherein when the controller recognizes the second touch input to the touchscreen in the quick memo input mode, the controller erases the characters or the figures input by the first touch input corresponding to the second touch input.

7. The mobile terminal according to claim 1, wherein when the touchscreen is in the quick-memo input mode, the controller controls the touchscreen to display a quick-memo button on a first portion of the touchscreen to select a pen type and to store or delete the characters or the figures, and
    the controller controls a touch input on the quick-memo button at the first portion of the touchscreen in the mouse input mode, so as to implement a function of the corresponding button.

8. The mobile terminal according to claim 7, wherein the selecting of the pen type includes selecting of at least one of texture, thickness and color or selecting of an eraser.

9. The mobile terminal according to claim 8, wherein the controller controls a user's physical touch on a second portion of the touchscreen to be neglected, and the controller only allows a touch input by the stylus pen on the first portion of the touchscreen when the touchscreen is in the quick-memo input mode.

10. The mobile terminal according to claim 1, wherein the stylus pen further includes:
    a rotary portion to rotate with respect to a longitudinal direction of the stylus pen,
    wherein when the touchscreen is in the quick-memo input mode, the sensing part senses a rotation of the rotary portion when the rotary portion is rotated, and the controller performs at least one of changing a thickness, changing a color, changing a texture and selecting an eraser for erasing characters or figures.

11. The mobile terminal according to claim 1, wherein the stylus pen further includes:
    a switch, and
    when the touchscreen is in the quick-memo input mode and the switch is pressed, the controller performs at least one of changing a thickness, changing a color, changing a texture and selecting an eraser for erasing characters or figures.

12. The mobile terminal according to claim 1, further comprising:
a body having the touchscreen, the sensing part and the controller; and
a case having the stylus pen detachably coupled thereto,
wherein when the stylus pen is separated from the case, the controller to restrict a touch input by a user's physical touch on the touchscreen and the controller to control only a touch input by the stylus pen.

13. The mobile terminal according to 12, wherein when no touch input is provided by the stylus pen for a preset time period, the controller to allow the touch input by the user's physical touch.

14. The mobile terminal according to claim 12, further comprising:
a coupling hole formed in a back side of the case to couple to an end of the stylus pen,
wherein when the stylus pen is coupled to the coupling hole, the controller to allow the touch input by the user's physical touch.

15. The mobile terminal according to claim 14, wherein when the sensing part senses that the stylus pen is provided at a first length, the controller controls the touchscreen to display an application or contents associated with multimedia.

16. The mobile terminal according to claim 14, wherein when the sensing part senses that the stylus pen is provided at a second length less than the first length, the controller controls the touchscreen to share data with another multimedia device via a wireless communication and display the data on the another multimedia device.

17. The mobile terminal according to claim 1, wherein the stylus pen includes a wireless communication device to provide a wireless signal to the mobile terminal, and the wireless signal to indicate the state variation of the stylus pen.

18. The mobile terminal according to claim 1, wherein the stylus pen further includes:
a rotary portion to rotate with respect to a longitudinal direction of the stylus pen,
wherein the controller determines the state variation based on a rotation of the rotary portion.

19. The mobile terminal according to claim 1, wherein the stylus pen further includes:
a switch, and
wherein the controller determines the state variation based on an input to the switch.

20. A mobile terminal comprising: a touchscreen to be provided in one of three input modes, the three input modes including a mouse input mode, a gesture input mode or a quick-memo input; a sensing part to sense a state variation of a stylus pen, wherein the state variation includes a length variation of the stylus pen; and a controller to change the input mode of the touchscreen based on the state variation of the stylus pen, wherein the mouse input mode to implement a corresponding application or a corresponding function based on a touch input to the touchscreen, the gesture input mode to implement a function corresponding to the touch input having a preset pattern, and the quick-memo input mode to store characters or figures that are input onto the touchscreen.

\* \* \* \* \*